United States Patent [19]
Clarke

[11] 3,935,510
[45] Jan. 27, 1976

[54] GROUND FAULT PROTECTIVE SYSTEM INCLUDING AN IMPEDANCE RESPONSIVE OSCILLATOR

[75] Inventor: Geoffrey Clarke, Blunsdon, near Swindon, England

[73] Assignee: Square D Company, Park Ridge, Ill.

[22] Filed: Feb. 25, 1974

[21] Appl. No.: 445,379

[52] U.S. Cl............ 317/18 D; 317/27 R; 317/33 SC
[51] Int. Cl.² .......................................... H02H 3/28
[58] Field of Search... 317/18 R, 18 D, 27 R, 33 SC

[56] References Cited
UNITED STATES PATENTS
| | | | |
|---|---|---|---|
| 3,506,906 | 4/1970 | Nestor | 317/18 D |
| 3,772,569 | 11/1973 | Wible | 317/18 D |
| 3,800,189 | 3/1974 | Montz | 317/18 D |

*Primary Examiner*—James D. Trammell
*Attorney, Agent, or Firm*—Harold J. Rathbun; Ernest S. Kettelson; James S. Pristelski

[57] ABSTRACT

A ground fault protective system and method in which an impedance responsive oscillator detects low impedance ground faults on the neutral conductor of an electrical distribution circuit and responds thereto to provide a partially or totally attenuated output signal. A level detector senses the magnitude of the output signal of the oscillator and causes a trip circuit to open contacts in the electrical distribution circuit whenever the attenuated oscillator output signal occurs.

1 Claim, 4 Drawing Figures

GROUND FAULT PROTECTIVE SYSTEM INCLUDING AN IMPEDANCE RESPONSIVE OSCILLATOR

BACKGROUND OF THE INVENTION

This invention relates to a ground fault current protective system, or ground fault circuit interrupter, for use in an electrical distribution circuit with a grounded neutral conductor, and more particularly relates to such a ground fault protective system which detects and responds to low impedance ground faults on the neutral conductor, which occur on the load side of the ground fault protective system, by partial or total attenuation of an output signal of an oscillator which is responsive to the impedance level in the neutral conductor.

After the introduction of ground fault protective systems using differential transformers which were intended to protect people against ground fault currents as low as five milliamperes, it was discovered that such systems had difficulty responding to line conductor to ground faults when a low impedance ground fault existed on the neutral conductor between the load and the ground fault detector. This problem occurs because a low impedance ground fault on the neutral conductor results in the neutral conductor becoming a shorted or low impedance winding of the differential transformer. Such a low impedance winding, under ground fault conditions on the line conductor, diverts most of the magnetic energy of the differential transformer from its secondary winding leaving little or no magnetic energy for providing a signal to interrupt the electrical distribution circuit.

One previously proposed solution to the low impedance neutral conductor problem is to insert an impedance in the neutral conductor between the ground fault sensing means and the load as is disclosed in U.S. Pat. No. 3,473,091 issued on Oct. 14, 1969 to A. R. Morris et al. Another prior solution is disclosed in U.S. Pat. No. 3,611,035 issued on Oct. 5, 1971 to E. S. Douglas. Here a high frequency tickler voltage is induced onto the neutral conductor to cause a current imbalance in the line and neutral conductors which is detected by the ground fault sensing means when a ground fault occurs on the neutral conductor.

SUMMARY AND OBJECTS OF THE INVENTION

According to the present invention, means for detecting low impedance levels in the neutral conductor in the form of an impedance responsive oscillator is provided. Level detecting means is also provided to produce an output for interrupting the electrical distribution circuit whenever the oscillator output signal is partially or totally attenuated in response to a low impedance ground fault on the neutral conductor.

A general object of the present invention is to provide a new and improved ground fault protective system and method for assuring interruption of an electrical distribution circuit when a low impedance ground fault occurs on the neutral conductor of the distribution circuit.

Another object is to provide improved means responsive to low impedance ground faults on the neutral conductor of a distribution circuit.

An additional object is to provide an impedance responsive oscillator to detect and respond to the level of impedance in the neutral conductor of a distribution circuit, thereby providing a partially or totally attenuated oscillator output signal when a low impedance ground fault is present on the neutral conductor, and cooperating level detecting means to detect the level of the oscillator output signal and to interrupt the distribution circuit whenever the magnitude of the oscillator output signal falls below a predetermined threshold of the level detecting means.

A further object is to provide an improved ground fault protective system for use in an electrical distribution circuit having a grounded neutral conductor, the protective system including means for preventing a low impedance ground fault, which may occur on the neutral conductor on the load side of a means for detecting a ground fault on a line conductor of the distribution circuit, from affecting or varying the magnitude of ground fault current from the line conductor to ground required to actuate a ground fault detecting means of the protective system.

Yet another object of the present invention is to provide an improved ground fault protective system for use in an electrical distribution circuit having at least one line conductor connecting a source to a load and a grounded neutral conductor providing a return path from the load to the source, the protective system including a ground fault detector comprising first detecting means for detecting a ground fault on any line conductor, second detecting means for detecting a ground fault on the neutral conductor at any location between the load and the second detecting means, and circuitry operable by the first detecting means when a ground fault current from the line conductor to ground reaches a predetermined value, or by the second detecting means when the impedance in the neutral conductor is less than a predetermined value, to open contacts interposed in the line conductor or conductors of the distribution circuit between the source and the ground fault detector.

Further objects and features of the invention will become apparent as the description proceeds.

DESCRIPTION OF THE PREFERRED EMBODIMENTS

Embodiments of the present invention will now be described by way of example with reference to the accompanying drawings.

Figure 1:
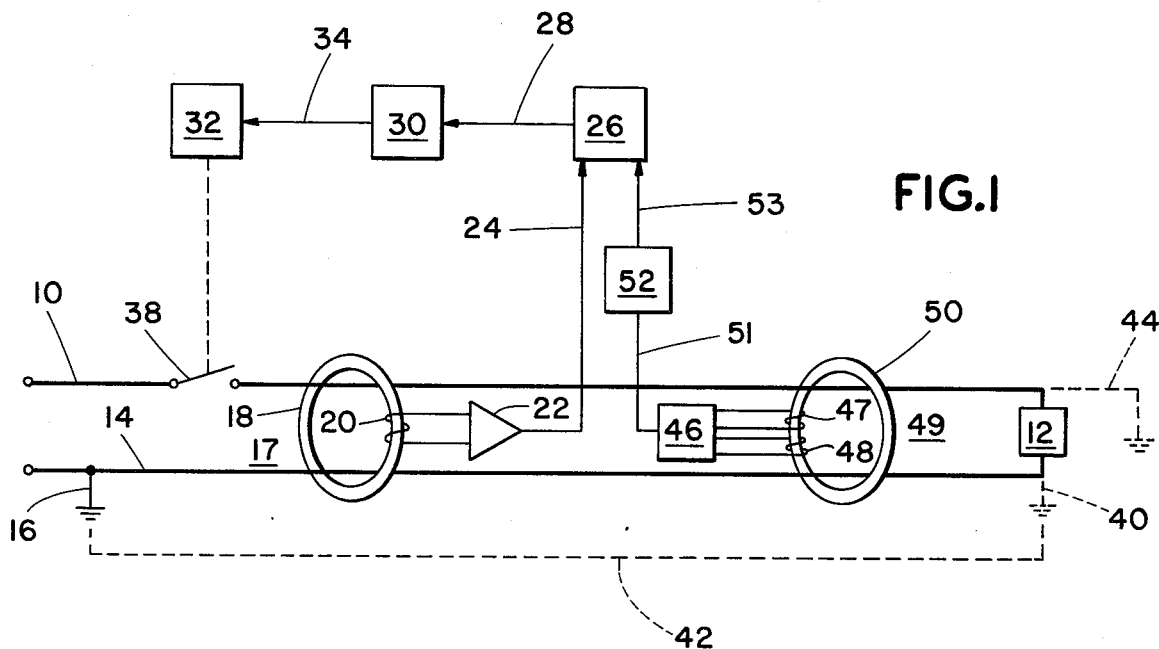
FIG. 1 is a schematic and block diagram of a ground fault protective system in accordance with this invention.

The invention is applicable to an electrical distribution circuit having one or a plurality of line conductors. FIG. 1 illustrates a distribution circuit having only one line conductor 10 connecting a voltage source (not shown) to a load 12. A neutral conductor 14 provides a current return path from the load 12 to the voltage source and is intentionally grounded as at 16. The ground fault protective system of FIG. 1 includes a differential transformer 17 having a magnetic core 18 and single turn primary windings provided by the conductors 10, 14 of the distribution circuit. The differential transformer also has a secondary winding 20 which is connected to a suitable amplifier 22.

Under normal conditions, the total current flowing through the line conductor 10 is equal to the current flowing through the neutral conductor 14 producing a zero net magnetic flux in the differential transformer core 18 and no voltage is induced in the secondary winding 20. When a ground fault occurs on the line conductor 10, the current in the line conductor 10 differs from that in the neutral conductor 14 by an amount equal to the magnitude of the ground fault current. This current difference produces a non-zero net magnetic flux in the transformer core 18 and generates a ground fault signal in the secondary winding 20. The ground fault signal is amplified by the amplifier 22, the output of which is connected over a line 24 to a level detector 26. When the amplified fault signal on the line 24 reaches a predetermined level, the level detector 26 generates an output over a line 28 which triggers an electronic switch 30 (typically, a thyristor) which energizes a trip circuit 32 over a line 34. When the trip circuit 32 is energized, a trip coil 36 (FIG. 3) of a circuit breaker (not shown) is energized and opens a contact 38 (FIG. 1) of the circuit breaker interposed in the line conductor 10.

Generally, ground fault protective systems without low impedance neutral conductor protection operate satisfactorily. Without a ground fault on the neutral conductor 14, the current from a ground fault on the line conductor 10, as at 44, returns to the voltage source through the ground, bypassing the portion of the neutral conductor 14 which passes through the differential transformer core 18. Thus the current in the neutral conductor 14 differs from that in the line conductor 10 by the amount of ground fault current and this current imbalance between the line conductor 10 and neutral conductor 14 establishes a non-zero magnetic flux in the differential transformer core 18. The non-zero magnetic flux causes a ground fault signal on the secondary winding 20 to be sensed and amplified by the amplifier 22. Interruption of the contact 38 then occurs as described above.

However, the operation of such a ground fault protective system is seriously impaired by the inadvertent occurrence of a low impedance ground fault — for example, as at 40 — on the neutral conductor 14 between the differential transformer 17 and the load 12. Grounding of the neutral conductor 14 as at 40 on the load side of the differential transformer 17 provides an alternate path 42 to the ground 16 at the voltage source for a ground fault current from the neutral conductor 14. A portion of the ground fault current from the line conductor 10 as at 44 may return to the voltage source through the ground at 44, the ground at 40, and the neutral conductor 14, with the remainder of the ground fault current returning to the voltage source through the ground at 44, the alternate path 42 and the ground 16. As a result, and depending upon the relative impedance of the ground paths, the sensitivity of the transformer 17 may be substantially reduced. It is thus extremely difficult to predict accurately the level of ground fault current required — for example, if a ground fault occurs at the point 44 on the line conductor 10 — to produce tripping and opening of the contact 38 since the increase in ground fault current required is dependent upon the magnitude of the impedance between the neutral conductor 14 and the ground fault at 40.

It is further to be noted that a low impedance ground fault on the neutral conductor 14 as at 40 causes the neutral conductor 14 to act as a shorted or low impedance winding of the transformer 17. Thus, the neutral conductor 14, when subjected to a low impedance ground fault as at 40, will remove most, if not all, of the magnetic energy established in the differential transformer core 18 by the transformation of magnetic energy into electrical energy in the conductor 14. The magnetic energy level of the differential transformer core 18, and also the magnitude of ground fault current from the line conductor 10 at 44 required to produce a predictable and constant ground fault current tripping threshold, are difficult to predict under the influence of a low impedance ground fault on the neutral conductor 14. Thus, the presence of a low impedance ground fault on the neutral conductor 14 affects the magnitude of ground fault current from the line conductor 10 required to cause the differential transformer core 18 to sense a ground fault because of the effect of the ground fault on the neutral conductor 14 on the magnetic energy level of the differential transformer core 18.

The foregoing describes the insensitivity of ground fault protective systems, without low impedance neutral conductor protection, to ground faults on the line conductor 10 when the neutral conductor 14 has a low impedance ground fault. Ground fault protective systems also experience difficulty responding to a low impedance ground fault on the neutral conductor 14 even if no ground fault exists on the line conductor 10. This second problem occurs because a low impedance ground fault as at 40 on the neutral conductor 14 causes the combination of the neutral conductor 14 and the alternate path 42 to effectively act as a shorted or low impedance secondary winding of the differential transformer 17. The neutral conductor 14 thus deprives the differential transformer core 18 of magnetic energy which would ordinarily be sensed by the secondary winding 20 to provide a control output to the amplifier 22. It will be appreciated that the demand of the neutral conductor 14 on magnetic energy from the differential transformer core 18 becomes greater as the impedance of the ground fault on the neutral conductor 14 decreases since the impedance of the neutral conductor 14 decreases with lower impedance ground faults.

By low impedance is meant that level of impedance or grounding in the neutral conductor 14 which renders the differential transformer 17 inoperative or insensitive to ground faults on the line conductor 10. It will be appreciated that this level of impedance depends upon the physical characteristics of each particular differential transformer 17, the load current levels for which the ground fault protective system is designed, the amplification provided by the amplifier 22, and the magnitude of the ground fault currents from the line conductor 10 to which the ground fault protective system must respond. Thus, the level of impedance in the neutral conductor 14 which can be characterized as "low" depends upon the design of the components of the particular ground fault protective system.

In accordance with this invention, the neutral conductor ground fault problem just described is solved by monitoring the impedance level in the neutral conductor 14 and providing means responsive to impedance levels lower than a predetermined threshold to cause opening of the electrical distribution circuit between the voltage source and the load 12.

In accordance with this approach, an oscillator 46 is provided in the protective system and the oscillator 46 is further provided with two windings 47, 48 serving as primary windings of a second transformer 49 having a core 50 with the two windings 47, 48 phased to produce positive feedback within the oscillator 46. Line and neutral conductors 10 and 14 serve as primary windings of the transformer 49. The oscillator 46 is designed to have its output signal on line 51 severely attenuated when a ground fault occurs on the neutral conductor 14 as at 40. A demodulator 52 receives the oscillator output signal from the line 51 and converts the oscillator output signal to a D.C. voltage level. The D.C. voltage level is carried on a line 53 to the level detector 26. The level detector 26 is arranged to trigger the electronic switch 30 when the oscillations from the oscillator 46 are partially or totally attenuated causing the D.C. voltage level of the demodulator 52 on the line 53 to fall below a predetermined level.

Figure 2:
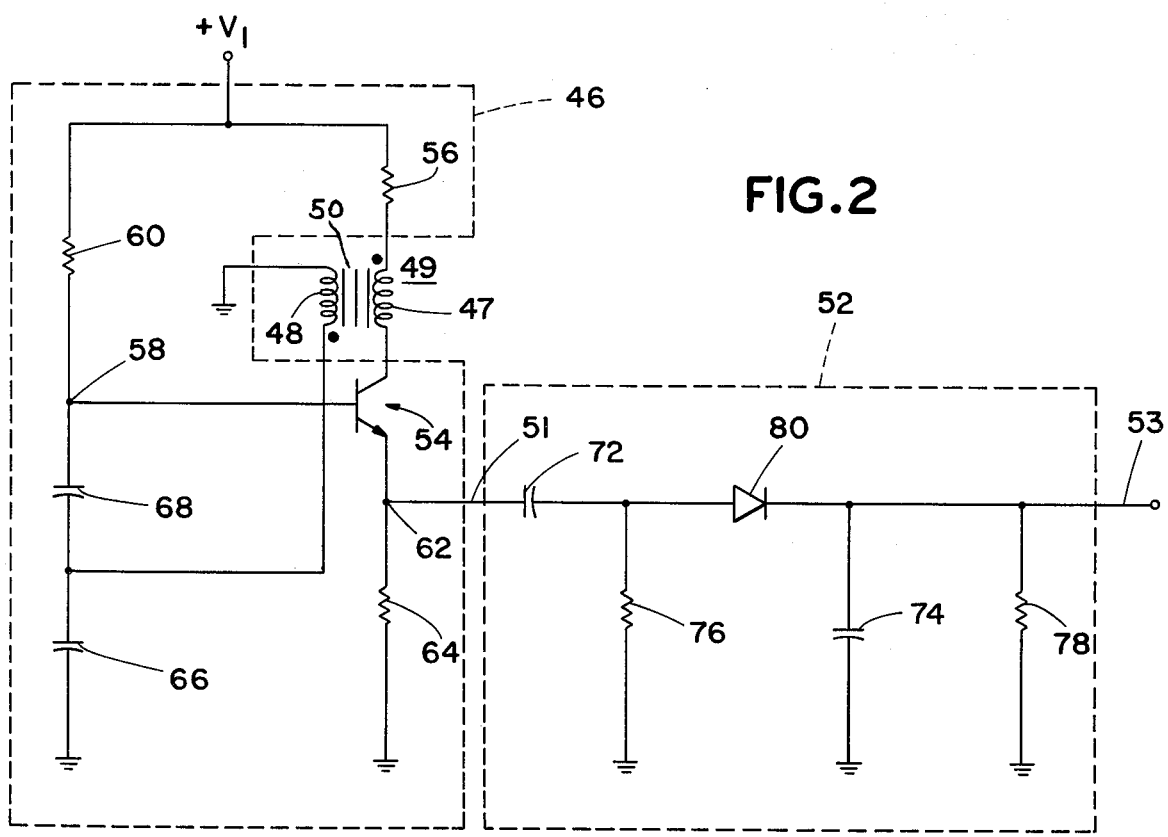
FIG. 2 is a schematic wiring diagram of an oscillator and a demodulator of the ground fault protective system of FIG. 1.

FIG. 2 is a schematic wiring diagram of a suitable 10 K Hz oscillator, generally designated 46, and a demodulator, generally designated 52, which has a positive going D.C. output. The oscillator 46 includes an NPN transistor 54 having its collector connected to a positive voltage supply $+V_1$ having, for example, a regulated D.C. voltage level within a range of +10 to +15V with 12V preferred, through the winding 47 and a 3.9 K ohm resistor 56, and its base connected directly to a junction 58 which is connected through a resistor 60 to the voltage supply $+V_1$. The emitter of the transistor 54 is connected directly to a junction 62 which is connected through a 4.7 K ohm emitter resistor 64 to ground. An L-C resonant tank circuit, comprising the winding 48 and a 0.01 microfarad capacitor 66 connected in parallel with each other to ground, is connected through a 0.01 microfarad capacitor 68 to the junction 58.

The output of the transistor 54 at the junction 62 is connected through the line 51 to the demodulator 52 which includes 0.01 microfarad capacitors 72 and 74, 100 K ohm resistors 76 and 78, and a diode 80 connected as shown between the line 51 and the line 53.

It will be appreciated by those skilled in the art that the large resistance of the emitter resistor 64 in the oscillator 46 provides stable oscillator operation and that the high impedance of the tank circuit comprising the capacitor 66 and the winding 48 results in high sensitivity of the oscillator 46 to the feedback loop which includes the resistor 64, the L-C resonant tank circuit, and the capacitor 68. It will be further appreciated that the windings 47 and 48, which are magnetically coupled by the transformer core 50, must be phased as shown by the polarity dots in FIG. 2 to achieve the required positive feedback required for sustained oscillation.

When a ground fault occurs on the neutral conductor 14, as at 40 (FIG. 1), the result is to effect a shorted turn around the transformer core 50. A small alternating current is induced in this shorted turn which does not affect the normal balance conditions of the transformer 17, but which absorbs power from the L-C resonant tank circuit (which includes the winding 48 around the core 50) and damps, or depending upon the impedance of the shorted turns, completely eliminates, oscillations from the oscillator 46. Since the demodulator 52 rectifies and smooths the oscillator output signal, the D.C. voltage level of the demodulator 52 on the line 53 drops toward zero volts as the oscillator output signal is partially or totally attenuated.

Figure 3:
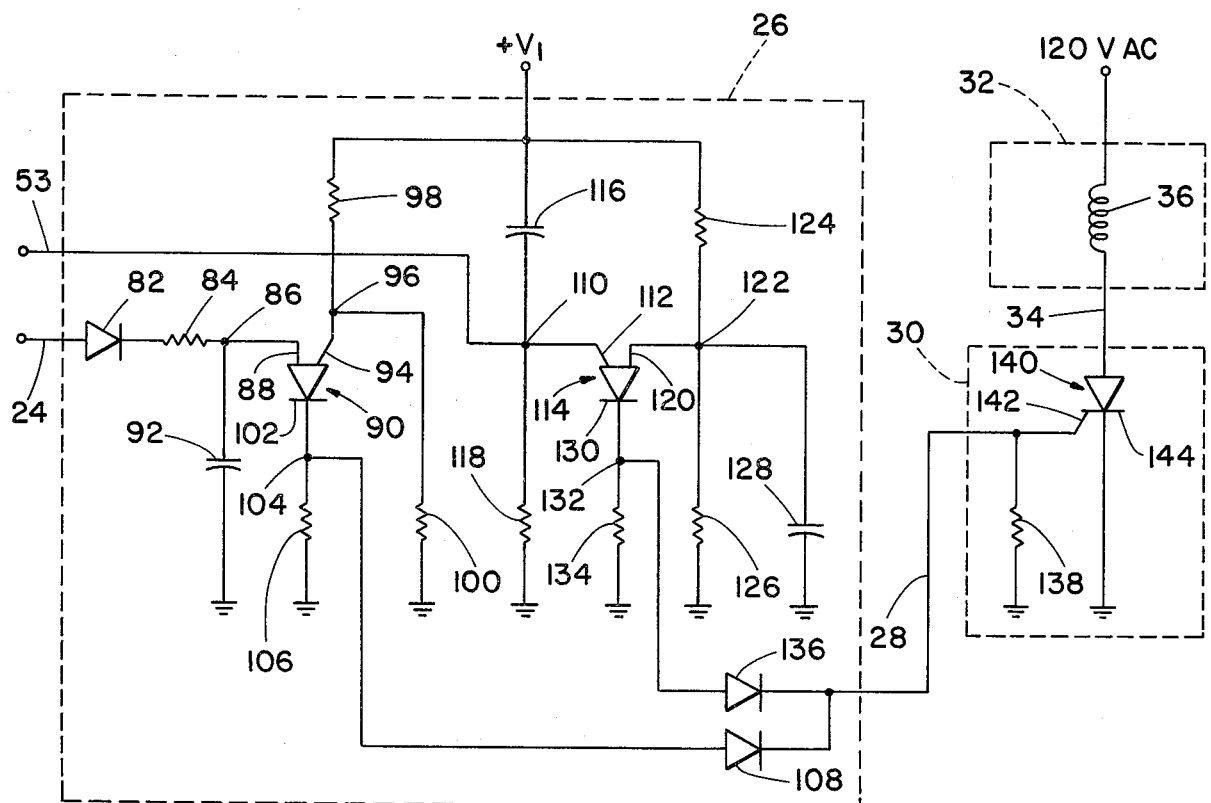
FIG. 3 is a schematic wiring diagram of a level detector of the ground fault protective system of FIG. 1.

A schematic wiring diagram of a suitable level detector 26 which may be employed in the system of the present invention is shown in FIG. 3. The output of the amplifier 22 (FIG. 1) on the line 24 is connected in the level detector 26 through the series combination of a diode 82 and a resistor 84 to a junction 86. Junction 86 is connected directly to the anode 88 of a programmable unijunction transistor (hereafter designated PUT) 90 and through a capacitor 92 to ground. The gate 94 of the PUT 90 is connected to a junction 96 which in turn is connected through a resistor 98 to the positive voltage supply $+V_1$ and through a resistor 100 to ground. The cathode 102 of PUT 90 is connected to a junction 104. Junction 104 is connected through a resistor 106 to ground and through a diode 108 to the line 28 which provides the input to the electronic switch 30.

The output of the demodulator 52 is connected over the line 53 to a junction 110 of the level detector 26 which in turn is connected directly to the gate 112 of a PUT 114. Junction 110 is also connected through a capacitor 116 to the positive voltage supply $+V_1$ and through a resistor 118 to ground. The anode 120 of the PUT 114 is connected to a junction 122 which in turn is connected through a resistor 124 to the positive voltage supply $+V_1$, through a resistor 126 to ground, and through a capacitor 128 to ground. The cathode 130 of the PUT 114 is connected to a junction 132. Junction 132 is connected through a resistor 134 to ground and through a diode 136 to the line 28.

It will become apparent that the contacts 38 (FIG. 1) are caused to interrupt the electrical distribution circuit by either of two independent means. When the output from the amplifier 22 resulting from a ground fault creating a non-zero net magnetic flux in the differential transformer core 18 and applied over the line 24 exceeds a predetermined value, the diode 82 in the level detector 26 (FIG. 3) conducts, charging the capacitor 92. The output signal of the amplifier 22 on the line 24 is a sine wave of the same frequency as that of the voltage source and proportional in magnitude to the magnitude of ground fault current. The diode 82 therefore begins to conduct during that portion of the positive one-half cycle in which the ouput of the amplifier on the line 24 exceeds the voltage on the capacitor 92 plus the forward biased voltage drop of the diode 82. When the voltage difference between anode 88 and the gate 94 of the PUT 90 exceeds a predetermined amount, the PUT 90 is switched into conduction, the capacitor 92 discharges through the PUT 90 into the cathode resistor 106 and the PUT 90 thereby generates an output signal at the junction 104 which is routed through the diode 108 to the line 28.

Alternatively, when the output of the oscillator 46 (FIG. 2), or of an oscillator 146 (FIG. 4) to be described, become attenuated due to a low impedance ground fault on the neutral line 14, the signals on the lines 51 and 53 decrease and the voltage difference between the anode 120 and the gate 112 of the PUT 114 becomes sufficient to trigger the PUT 114 into conduction, the capacitor 128, which has been charged from the voltage supply $+V_1$, discharges through the PUT 114 into the cathode resistor 134 and the PUT 114 thereby generates an output signal at the junction 132. This output signal is routed through the diode 136 to the line 28.

The capacitor 116 prevents switching of the PUT 114 into a conductive state when the positive voltage supply $+V_1$ is initially energized.

The signal on the line 28 is applied to a gate electrode of a thyristor 144 in the electronic switch 30 which electrode is connected to ground through a resistor 138. The anode-cathode circuit of the thyristor 144 is in series with the winding 36 of the trip circuit 32. Preferably, the winding 36 forms a portion of a magnetic trip mechanism of a circuit breaker having contacts 38 as shown in FIG. 1 but other forms of trip circuits may be used.

Figure 4:
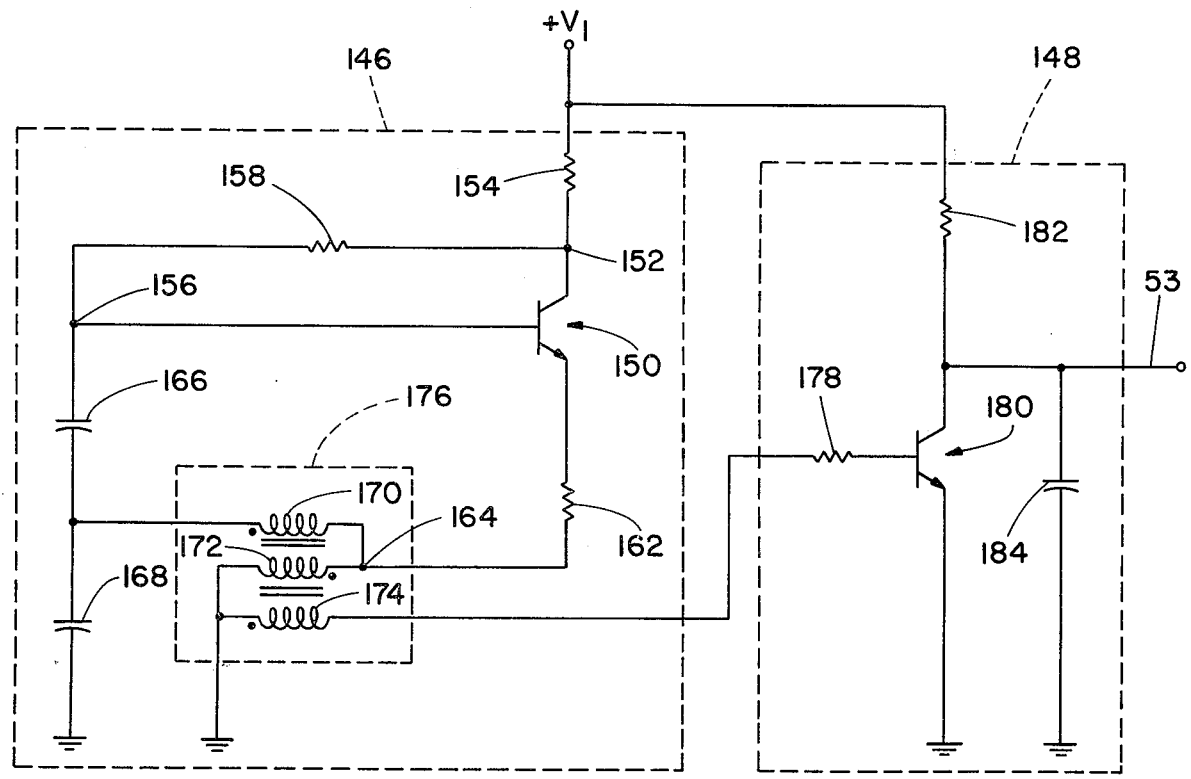
FIG. 4 is a schematic wiring diagram of a modified oscillator and a demodulator for use in the system of FIG. 1 and capable of operation over wide temperature ranges.

FIG. 4 is a schematic wiring diagram of a 10 K to 30 KHz oscillator 146, which has improved wide range temperature operating characteristics compared to the oscillator 46 of FIG. 2, and a demodulator 148 which has a positive going output. The oscillator 146 is capable of operating over the temperature range +35° to −77°C as established in Underwriter Laboratories, Inc. standard U.-943. The oscillator 146 utilizes an NPN transistor 150 having its collector connected to the positive voltage supply $+V_1$ through the series combination of a junction 152 and a 470 ohm resistor 154 and its base connected directly to a junction 156 which is connected through a 330 K ohm bias resistor 158 to the junction 152. The emitter of the transistor 150 is connected through a 5.1K ohm resistor 162 to a junction 164. The base of the transistor 150 is also connected through the junction 156 to an 820 picofarad AC signal coupling capacitor 166. The other terminal of the capacitor 166 is connected through a 5100 picofarad capacitor 168 to ground and through the series combination of a winding 170, the junction 164 and a winding 172 to ground.

The windings 170, 172 and a third winding 174 are wound on a toroidal core (not shown, but similar to the toroidal core 50 in FIG. 1) to form a transformer 176. The primary windings of the transformer 176 are the conductors 10 and 14, or the conductor 14 alone, of FIG. 1 and are not shown in FIG. 4. The winding 170 may have 51 turns, the winding 172 may have 30 turns, and the third winding 174 may have 72 turns. The transformer 176 and the capacitor 168 form an LC tank circuit with the resonant frequency of the tank circuit determining the frequency of oscillation of the oscillator 146. To provide the positive feedback required for sustained oscillation, the windings 170, 172 must be phased as shown by the polarity dots adjacent to each winding 170, 172. The phase of the third winding 174 is unimportant to the operation of either the oscillator 146 or the demodulator 148 and is phased as shown in FIG. 4 only for the purposes of illustrating one possible embodiment.

As mentioned, the transformer 176 is also magnetically coupled with the neutral conductor 14 (FIG. 1) or both the line conductor 10 and the neutral conductor 14. In a typical embodiment, the neutral conductor 14 passes through the toroidal core, providing the equivalent of a single turn winding. It will be further appreciated that when the oscillator 146 and the demodulator 148 of FIG. 4 are used, there will be three windings 170, 172 and 174 around the toroidal core instead of the two windings 47, 48 around the toroidal core 50 as shown in FIG. 1.

The third winding 174 magnetically couples an AC signal into the demodulator 148 through a 33K ohm resistor 178 to the base of an NPN transistor 180. The collector of the transistor 180 is connected to the positive voltage supply $+V_1$ through a 47K ohm resistor 182. The collector of the transistor 180 is also connected to ground through a 0.1 microfarad timing capacitor 184 and the collector of the transistor 180 also provides the output signal of the demodulator 148 on the line 53 to the level detector 26.

The RC time constant of the resistor 182 and the timing capacitor 184 is chosen to activate the level detector 26 in sufficient time to provide adequate ground fault current interruption protection. In a typical application, this RC time constant is approximately 4.7 milliseconds. Since the oscillator 146 is designed to provide a frequency of 10K to 30 KHz, the period of the oscillation is 0.1 milliseconds or less. The output signal of the oscillator 146 is provided by the third winding 174, with reference to ground, to the base of the transistor 180 through the resistor 178. The transistor 180 conducts only on the positive half cycles of the signal at the third winding 174. The frequent periodic conduction of the transistor 180 with reference to the RC time constant of the resistor 182 and the timing capacitor 184, prevents the timing capacitor 184 from charging whenever the oscillator 146 is providing an output signal at the third winding 174. However, if the oscillator signal across the third winding 174 is sufficiently attenuated or eliminated, the timing capacitor 184 charges toward the positive supply voltage $+V_1$ thereby reaching the threshold of the level detector 26. The oscillator signal across the third winding 174 is partially or totally attenuated when a low impedance ground fault occurs, as at 40, on the load side of the transformer core since the neutral conductor 14 then behaves as a shorted or low impedance winding on the transformer 176 thereby depriving the transformer 176 of sufficient magnetic energy to provide an oscillator signal at the third winding 174.

It should be noted that the gate and anode terminals 112 and 120, respectively, of the PUT 114 must be interchanged from their connections with the junctions 110 and 122, respectively, when the oscillator 146 and the demodulator 148 of FIG. 4 are used in the ground fault protective system. The terminals 112, 120 must be interchanged because the output of the demodulator 52 (FIG. 1) on the line 53 is normally at a positive D.C. voltage level and when the output signal of the oscillator 46 on the line 51 ceases or diminishes in response to a low impedance ground fault on the neutral conductor 14, the voltage level on the line 53 drops toward ground potential. Conversely, the output of the demodulator 148 (FIG. 4) is normally at approximately ground potential and rises toward the voltage level of the voltage supply $+V_1$ when the periodic conduction of the transistor 180 ceases or diminishes in response to a low impedance ground fault on the neutral conductor 14. Thus, the voltage level of the output of the demodulator 148 on the line 53 behaves inversely to that of the demodulator 52 and the gate and anode terminals 112 and 120, respectively, must be interchanged between the junctions 110 and 122, respectively, from the indicated connections in FIG. 3 whenever the demodulator 148 is utilized. Further, when the terminals 112, 120 are interchanged to adapt the level detector 26 for use with the demodulator 148, the capacitor 116 should be removed from the level detector 26. The capacitor 116 is unnecessary when the demodulator 148 is utilized since an erroneous output of the level detector 26 on the line 28 will not occur during turn on of the voltage supply +V₁.

In the circuit of FIG. 4, the selection of the toroidal core for the transformer 176 is critical to obtain satisfactory operation over a wide temperature range. It will be appreciated by those skilled in the art that the LC tank circuit, comprising the capacitor 168 and the transformer 176, operates with the loss of a small amount of energy from the LC tank circuit to the demodulator 148. It will also be appreciated that the loss of energy from the LC tank circuit to other circuit components should be minimized to enhance the sensitivity of the oscillator 146 to ground faults on the neutral conductor 14 (FIG. 1). Hence, a ferrite material is preferred because of its relatively low hysteresis and low eddy current losses at the frequency of operation, e.g. 10 K to 30KHz.

A toroidal core material for the transformer 176 of a high permeability is also preferred since the oscillator 146 will be more sensitive to ground faults on the neutral conductor 14 when higher permeability core materials are used. Still a further constraint in selecting a suitable core material is that the permeability must remain constant over the temperature range to be encountered by the oscillator 146. Unfortunately, higher permeability ferrites generally have wider variations in permeability than lower permeability ferrites and therefore the choice of a suitable ferrite material is a compromise between high permeability and good temperature characteristics. A suitable ferrite core which is commercially available and which combines higher permeability with moderate temperature variation of the permeability is manufactured by the Stackpole Carbon Company of St. Marys, Penna. 15857, under the trade designation Ceramag 28.

The oscillator 146 and the demodulator 148 of FIG. 4 coact with the level detector 26 of FIG. 3 as previously described in connection with the oscillator 46 and the demodulator 52 of FIG. 2.

The oscillator 146 and the demodulator 148 of FIG. 4 may be substituted for the oscillator 46 and the demodulator 52 of FIG. 2. where wide temperature performance is required and/or cost is not an important factor. The oscillator 46 is significantly less expensive than the oscillator 146 because of the differences in the respective oscillator transformers 49, 176. The transformer 49 in the oscillator 46 includes two windings 47, 48 on an inexpensive ferrite core material whereas the transformer 176 in the oscillator 146 includes three windings 170, 172, 174 and a superior ferrite core material.

While the invention has been described in connection with certain perferred embodiments, it will be understood that they are not intended to limit the invention thereto, but rather to cover all modifications and alternative constructions falling within the spirit and scope of the invention as hereinafter claimed.

I claim:

1. In a ground fault current protective system for an electrical distribution circuit having at least one line conductor connecting a voltage source to a load and a neutral conductor grounded at the source at a ground terminal and providing a return path from the load to the source, said ground fault current protective system comprising a ground fault detecting means positioned on said distribution circuit and providing a ground fault output signal related in value to the magnitude of a ground fault current flowing to ground from the line conductor at any point between the ground fault detecting means and the load, an impedance detecting means positioned on said distribution circuit and providing an a.c. impedance output signal related in value to the impedance between ground and any point on the neutral conductor between the impedance detecting means and the load, a demodulator coupled to the impedance detecting means to convert the a.c. impedance output signal of the impedance detecting means to a d.c. voltage level related in value to the magnitude of the a.c. impedance output signal, and a level detecting means having a first input connected to the ground fault detecting means and having a second input connected to the demodulator with said level detecting means rendered operative to provide an output signal whenever the ground fault output signal reaches a predetermined value at said first input of the level detecting means and whenever the d.c. voltage level of the demodulator reaches a predetermined value at said second input of the level detecting means, the improvement wherein the impedance detecting means comprises an oscillator magnetically coupled to the neutral conductor by a transformer including a toroidal core, a plurality of oscillator windings, each of at least one turn, wound on the toroidal core for partially or totally attenuating the output oscillator signal whenever a low impedance occurs between ground and the neutral conductor on the load side of the protective system and for providing a positive feedback path for the oscillator, and another winding of at least one turn on the toroidal core connected in series with the neutral conductor.

* * * * *